H. VINETTE.
HOSE COCK.
APPLICATION FILED MAY 16, 1908.

936,496.

Patented Oct. 12, 1909.

WITNESSES:

INVENTOR.
H. Vinette
By Howard P. Denison
ATTORNEY.

UNITED STATES PATENT OFFICE.

HENRY VINETTE, OF PITTSFIELD, MASSACHUSETTS.

HOSE-COCK.

936,496.

Specification of Letters Patent. Patented Oct. 12, 1909.

Application filed May 16, 1908. Serial No. 433,319.

*To all whom it may concern:*

Be it known that I, HENRY VINETTE, of Pittsfield, in the county of Berkshire, in the State of Massachusetts, have invented new and useful Improvements in Hose-Cocks, of which the following, taken in connection with the accompanying drawings, is a full, clear, and exact description.

This invention relates to certain improvements in hose cocks forming a connection between the main water supply and hose which may be used either for fire or lawn purposes.

My main object is to provide an emergency hose cock which is normally closed but which will be automatically opened ready for use by the simple act of drawing the hose out in one direction or the other.

Another object is to provide yielding means for frictionally locking the rocking valve connection between the valve and hose in its closed position so that the valve will not be opened accidentally by any slight jar or vibration and at the same time is free to open under the pull exerted by the stretching out of the hose ready for use in directing a stream of water to any desired locality.

Other more specific objects will be brought out in the following description.

Figure 1:
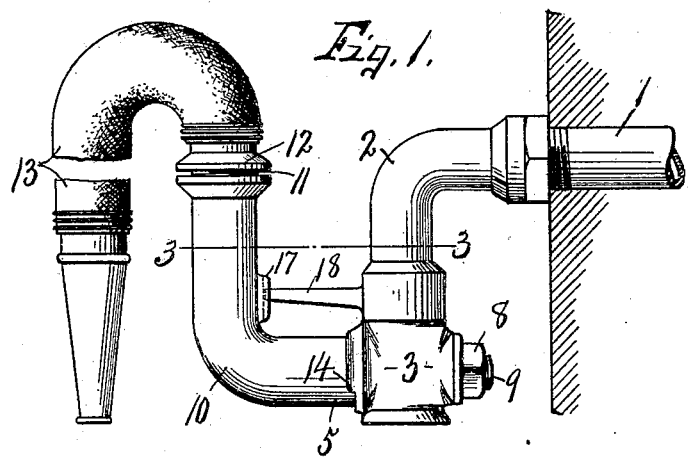
Figure 2:
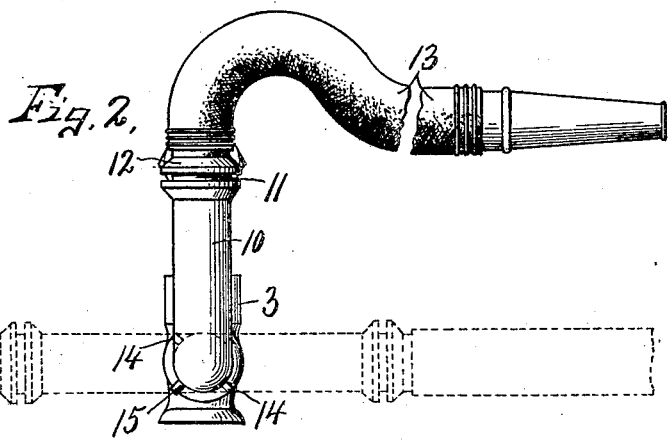
Figures 3, 4, 5:
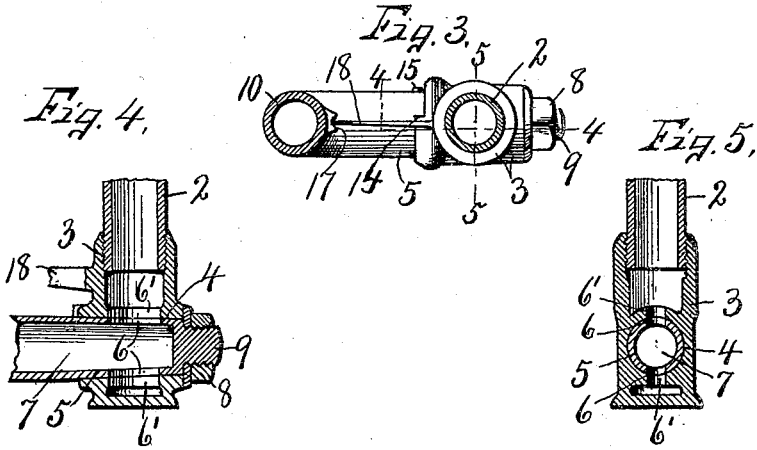

In the drawings—Figures 1 and 2 are respectively a side and front elevation of my improved hose cock, showing a portion of the supply pipe and hose attached thereto. Fig. 3 is a sectional view taken on line 3—3, Fig. 1. Figs. 4 and 5 are sectional views taken respectively on lines 4—4 and 5—5, Fig. 3 showing the valve open.

In carrying out the objects stated a suitable water supply —1— is secured in any desired manner in the wall or any other suitable support and is provided with an external down turned elbow —2— terminating in a valve casing —3—, the latter having a transverse opening —4— in which is fitted a taper valve —5— having diametrically opposite water passages —6— communicating with a central passage —7— and with the interior of the valve casing —3—, through suitable passages —6'—, said valve being held to its seat by a suitable nut —8— which engages an external threaded extremity —9— of the valve. This valve is provided with a normally upturned elbow portion —10— extending some distance to one side of its axis of rotation and terminates in a threaded extremity —11— for receiving a hose coupling —12— of a suitable hose —13—, the latter being shown as broken away in Figs. 1 and 2 although it may be of and desired length. The valve casing —3— is provided with shoulders —14— which lie in the path of movement of a stop —15— on the valve —5— to limit the rocking movement of said valve to an arc of substantially 180° or from its vertical position shown in Fig. 1 to opposite horizontal positions shown by dotted lines in Fig. 2, said valve being therefore adapted to make a quarter turn in opposite directions from its normal position to open the same. The upturned portion of the valve is spaced some distance apart from the casing —3— and is provided on its inner face with a V-shaped recess —17— adapted to be engaged by one end of a spring finger —18— which projects from the adjacent side of the valve casing to frictionally lock the valve in its normal or closed position, said spring being sufficiently resilient to allow the valve to be rocked from its closed to its open position in either direction according to the direction of pull exerted upon the hose.

In operation when it is desired to use the hose to direct the stream to any desired locality, it is simply necessary to draw the hose laterally in the direction of movement of the valve and to exert a sufficient pull thereon to overcome the friction of the detent —18— whereupon the valve will be rocked from its closed position to its open position in the direction of said pull upon the hose, the diametrically opposite passages —6— in the valve being normally located at substantially right angles to the passages —6'— when the valve is closed so that by rotating the valve a quarter turn in either direction, both of said passages will be brought into registration with those in the valve casing.

What I claim is:

1. In combination with a water supply pipe, an elbow pipe secured thereto and terminating at its free end in a valve casing, a valve mounted for rotary movement in said casing and having a lateral offset, a hose detachably-connected to said offset, said valve being adapted to be rocked by the hose in either direction and being provided with passages movable into communication with the valve casing during such rocking movement, a stop carried by the valve, a lug carried by the casing to be engaged by the stop for limiting the opening movement of the valve in both directions, and a resilient arm carried by the valve casing for engagement with the lateral offset of the valve for normally holding the valve in closed position.

2. In combination with a water supply pipe having a down-turned extremity terminating in a valve casing, a normally closed rocking valve in the casing said valve having a lateral offset, a hose secured to the offset, a lug on the valve casing and a stop on the valve to engage said lug and limit the movement of the valve in both directions, and a yielding means carried by the valve casing for engagement with the lateral offset of the valve to normally hold the latter in closed position, said valve being adapted to be opened by turning it in either direction around its axis.

In witness whereof I have hereunto set my hand this eleventh day of May 1908.

HENRY VINETTE.

Witnesses:
   JOHN T. COYNE,
   JOHN B. CUMMINGS.